United States Patent [19]

Kawamoto

[11] Patent Number: 4,767,925

[45] Date of Patent: Aug. 30, 1988

[54] OPTICAL TYPE RELATIVE ROTATION MEASUREMENT APPARATUS

[75] Inventor: Mutumi Kawamoto, Tokyo, Japan

[73] Assignees: Aisin-Warner Kabushiki Kaisha, Aichi; Kabushiki Kaisha Shinsangyokaihatsu, Tokyo, both of Japan

[21] Appl. No.: 947,255

[22] Filed: Dec. 29, 1986

[30] Foreign Application Priority Data

Dec. 28, 1985 [JP] Japan .............................. 60-298302

[51] Int. Cl.$^4$ ............................................... G01D 5/34
[52] U.S. Cl. .......................... 250/231 SE; 250/237 G
[58] Field of Search .................... 250/231 SE, 237 G; 340/347 P; 356/373, 375

[56] References Cited

U.S. PATENT DOCUMENTS

| | | | |
|---|---|---|---|
| 4,135,391 | 1/1979 | Dahle | 73/136 A |
| 4,224,514 | 9/1980 | Weber | 250/231 SE |
| 4,263,506 | 4/1981 | Epstein | 250/231 SE |
| 4,552,241 | 11/1985 | Suzuki | 180/249 |
| 4,654,525 | 3/1987 | Ebina et al. | 250/231 SE |

*Primary Examiner*—David C. Nelms
*Assistant Examiner*—Stephone B. Allen
*Attorney, Agent, or Firm*—Wegner & Bretschneider

[57] ABSTRACT

An optical rotary encoder is provided with a pair of corrective light-emitting and light-receiving elements in addition to a pair of light-emitting and light-receiving elements that are for producing an output in dependence upon the relative rotation of two slitted disks. A corrective reference voltage is produced from the output of the corrective light-emitting and light-receiving elements and an output conforming to the relative rotation is produced with the reference voltage serving as a threshold. If the amount of light produced by the light-emitting element decreases or if the amount of light reaching the light-receiving element is reduced due to a decrease in light transmission through the medium in which the encoder is used, the corrective reference voltage changes accordingly so that accurate output pulses conforming to the relative rotation are obtained at all times. Accordingly, in an arrangement where the rotary encoder is installed in the transfer system of an automobile to measure drive torque, drive shaft torsion, namely drive torque, can be measured accurately even if optical transmission through the transfer oil changes due to temperature or contamination or if the amount of light generated by the light-emitting element decreases.

20 Claims, 12 Drawing Sheets

OPTICAL TYPE RELATIVE ROTATION MEASUREMENT APPARATUS

BACKGROUND OF THE INVENTION

This invention relates to an optical rotary encoder for measuring an angle of rotation. More particularly, the invention relates to an optical rotary encoder adapted for torque detection and provided in the transfer of a four-wheel drive vehicle equipped with a center differential mechanism.

When an automotive vehicle is traveling, front-wheel drive generally provides better stability for forward motion than rear-wheel drive. When the vehicle is cornering, however, the tires attempt to return to their original attitude and a force must be applied to them by turning the steering wheel. Turning tends to be difficult with front-wheel drive. Though turning is easier with rear-wheel drive, a driving force which is too strong can result in an excessive turn. Accordingly, applying a driving force evenly to the front and rear wheels is ideal for stable vehicle travel. This is achieved with excellent results with a four-wheel drive vehicle.

The left and right wheels of an automotive vehicle exhibit different turning radii at cornering. In order to compensate for the effects of this phenomenon and achieve cornering smoothly, a four-wheel drive vehicle is equipped with a differential mechanism (front and rear differentials) which absorbs the difference in rotating speeds between the left and right wheels in dependence upon the difference in turning radius. Since a difference is turning radius also develops between the front and rear wheels, it has been proposed to provide a four-wheel drive vehicle with a center differential mechanism which absorbs the difference in rotating speeds between the front and rear wheels in dependence upon the difference in turning radius.

However, since the center differential mechanism functions to distribute front and rear wheel torque at an equal ratio, a limitation upon the transfer of driving force results in balance being achieved at either the front-wheel or rear-wheel driving force, whichever has the lower value. For example, if one of the front wheels should happen to lose traction with the road and begin racing, the driving energy will dissipate itself at the front wheels so that very little driving force will be applied to the rear wheels. Consequently, there are situations where a four-wheel drive vehicle with a center differential mechanism exhibits a deterioration in transmitted driving force, as when the road surface has a low coefficient of friction, in comparison with a four-wheel drive vehicle without a center differential mechanism. This can cause a phenomenon such as slipping (racing) of the front or rear wheels due to an inability to transfer the driving force to the road surface sufficiently, as when a large driving force is produced at acceleration.

In order to prevent these detrimental effects, the conventional practice is to provide a locking mechanism for a direct transfer of power between the front and rear wheels without the intervention of the center differential. When a large driving force becomes necessary, as during acceleration or when driving on a poor road surface, the center differential is locked manually. Under ordinary driving conditions when a large driving force is not required, the center differential is manually unlocked.

If the vehicle is traveling with the center differential locked, however, at cornering the front wheels will rotate too fast in comparison with the rear wheels when the turning radius is small. As a result, a negative torque develops on the front-wheel side and it is just as if braking were being applied solely to the front wheels. In other words, a so-called "tight corner braking" phenomenon occurs. If the vehicle is traveling at high velocity and the centrifugal force produced by the turn is large, this phenomenon can cause the tires to skid in the centrifugal direction so that the difference in rotating speed between the front and rear wheels is absorbed by the skidding of the tires. This has a deleterious influence upon the stability of the traveling vehicle during cornering. Manually unlocking the center differential mechanism is not a solution because this will not allow the condition of the road surface to be judged accurately.

Thus, if the center differential mechanism is locked during vehicle travel, the tight corner braking phenomenon occurs. In order to prevent this with assurance, it is necessary to monitor front wheel torque constantly and unlock the center differential mechanism automatically if, say, the front wheels develop a negative torque. This makes it necessary to measure the torque of the driven wheels. One method of accomplishing this is to measure the angle of torsion of the drive shaft.

One known expedient for measuring a turning angle such as the torsional angle of a shaft is an optical rotary encoder.

FIG. 10 illustrates an optical rotary encoder according to the prior art, and FIG. 11 is a block diagram of a turning angle measurement apparatus using an optical rotary encoder.

In FIG. 10, the rotary encoder is shown to include slitted disks 1, 2 each of which is provided with circumferentially spaced slits. Specifically, the disk 1 is provided with slits 3, and the disk 2 is provided with slits 4, 5 staggered by one-quarter of a pitch with respect to the slits 3. Numerals 6, 7 denote light-emitting elements, and numerals 8, 9 represent light-receiving elements. In FIG. 11, the output sides of the light-receiving elements 8, 9 are connected to the input sides of amplifier circuits 10, 11, respectively. Comparator circuits 12, 13 compare the respective outputs of the amplifier circuits 10, 11 with a fixed reference voltage and produce an output when the output from the corresponding amplifier circuit exceeds the reference voltage. The outputs of the comparator circuits 12, 13 are applied to output circuits 14, 15, respectively.

When the slitted disks 1, 2 rotate relative to each other, the light-receiving elements 8, 9 produce outputs displaced from each other by 90°. The direction of rotation is judged based on which of the phases is leading. These outputs from the light-receiving elements are compared with the fixed reference voltage by the comparator circuits 12, 13. When the outputs exceed the reference voltage, the output circuits 14, 15 produce output pulses. The relative turning angle is measured by integrating these output pulses.

Ordinarily, an optical rotary encoder of this type is enclosed in a sealed package-like container and is used in a clean environment where it will not be splattered by oil, grease or the like. Accordingly, when it is attempted to measure the turning angle of a vehicle drive shaft by installing the optical rotary encoder in the transmission or the like and setting up the measurement apparatus shown in FIG. 11, the encoder must be immersed in oil.

When the ability of the oil to transmit light diminishes due to temperature or, above all, contamination, the light-receiving elements 8, 9 receive less light. This not only makes it difficult to measure the turning angle accurately but can make measurement impossible in extreme cases.

FIG. 12 is a view useful in describing such a situation. In FIG. 12, $a_1$, $b_1$ illustrate the outputs of the respective light-receiving elements 8, 9 when the rotary encoder operates in the air. Similarly, $a_2$, $b_2$ show these outputs in clean oil, and $a_3$, $b_3$ show them in contaminated oil. The waveforms $c_1$, $d_1$ indicate the outputs of the respective comparator circuits 12, 13 when the encoder operates in air, and the waveforms $c_2$, $d_2$ indicate these outputs when the encoder operates in clean oil. A level e is the fixed reference voltage applied to the comparator circuits 12, 13, and a level f represents the light-receiving element output when the light from the light-emitting elements is blocked off completely from the light-receiving elements.

When the rotary encoder is disposed in the air, an adequate amount of light reaches the light-receiving elements. As a result, the outputs $a_1$, $b_1$, which differ in phase by 90°, are obtained from the light-receiving elements 8, 9, these outputs are compared with the fixed reference voltage e, the output pulses $c_1$, $d_1$ are obtained from the comparator circuits 12, 13, and these pulses are integrated to measure the angle of torsion. When the rotary encoder is operated in clean oil, the light-receiving elements receive less light than they do in air. This means that the outputs of these elements will decrease to $a_2$, $b_2$. When these outputs are compared with the fixed reference voltage e, the result is that the output pulses produced by the comparator circuits have a narrower pulse width, as indicated by $c_2$, $d_2$. If the rotary encoder is immersed in contaminated oil, the light reaching the light-receiving elements $a_3$, $b_3$ diminishes even further, so that the outputs from these elements fall below the fixed reference level 3, as indicated by $a_3$, $b_3$. Consequently, output pulses can no longer be obtained from the comparator circuits 12, 13, thus making measurement impossible.

SUMMARY OF THE INVENTION

An object of the present invention is to provide an optical rotary encoder which can be used in oil such as in a transmission for accurately measuring a turning angle such as the angle of torsion of a drive shaft.

Another object of the present invention is to provide an optical rotary encoder which can be used in oil such as in a transmission for accurately measuring a turning angle such as the angle of torsion of a drive shaft even if the amount of light received varies due to a change in the optical transmission of the oil caused by a variation in temperature or the like.

Still another object of the present invention is to provide an optical rotary encoder which can be used in oil such as in a transmission for accurately measuring a turning angle such as the angle of torsion of a drive shaft even if the amount of light received is reduced by contamination of the oil.

A further object of the present invention is to provide an optical rotary encoder which can be used in oil such as in a transmission for accurately measuring a turning angle such as the angle of torsion of a drive shaft even if the amount of light emitted by the light-emitting elements diminishes.

Yet another object of the present invention is to provide an optical rotary encoder installed in the transfer system of an automotive vehicle for accurately measuring the angle of torsion of a drive shaft, namely the drive torque.

According to the present invention, the foregoing objects are attained by providing an optical rotary encoder comprising two opposing disks provided with slits, a first pair of light-emitting and light-receiving elements arranged with the disks interposed therebetween for generating an output in dependence upon relative rotation of the two disks, and a second pair of light-emitting and light-receiving elements for light intensity compensation, wherein a corrective reference voltage is obtained in response to an output from the second pair of light-emitting and light-receiving elements and the output from the first pair of light-emitting and light-receiving elements is compensated for by the corrective reference voltage. The foregoing objects are also attained by providing an optical rotary encoder comprising two opposing disks provided with slits, a first pair of light-emitting and light-receiving elements arranged with the disks interposed therebetween for generating an output in dependence upon relative rotation of the two disks, a second pair of light-emitting and light-receiving elements for light intensity compensation, and means for compensating for the output from the first pair of light-emitting and light-receiving elements by a corrective reference voltage obtained from an output produced by the second pair of light-emitting and light-receiving elements, one of the two disks being connected to a first shaft for wheel drive driven by a side gear of a differential mechanism, the other of the two disks being connected to a second shaft driven by the side gear.

Thus, a relative angle can be accurately measured at all times even if the amount of light generated by the light-emitting element diminishes or the amount of light received by the light-receiving element is reduced as by a decline in the transmission of light. Further, installing the rotary encoder of the present invention in the transfer system of an automotive vehicle makes it possible to accurately measure the twisting of the drive shaft, namely the drive torque, even if the optical transmission of the oil changes due to contamination or a variation in temperature, or if there is a reduction in the amount of light from the light-emitting element.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the invention will now be described with reference to the drawings.

Figure 1:
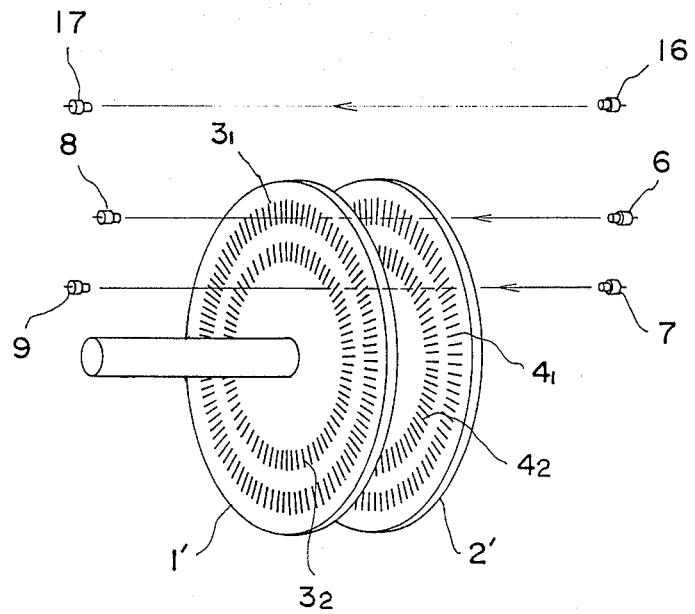
FIG. 1 is a perspective view illustrating an embodiment of an optical rotary encoder according to the present invention.
Figure 2:
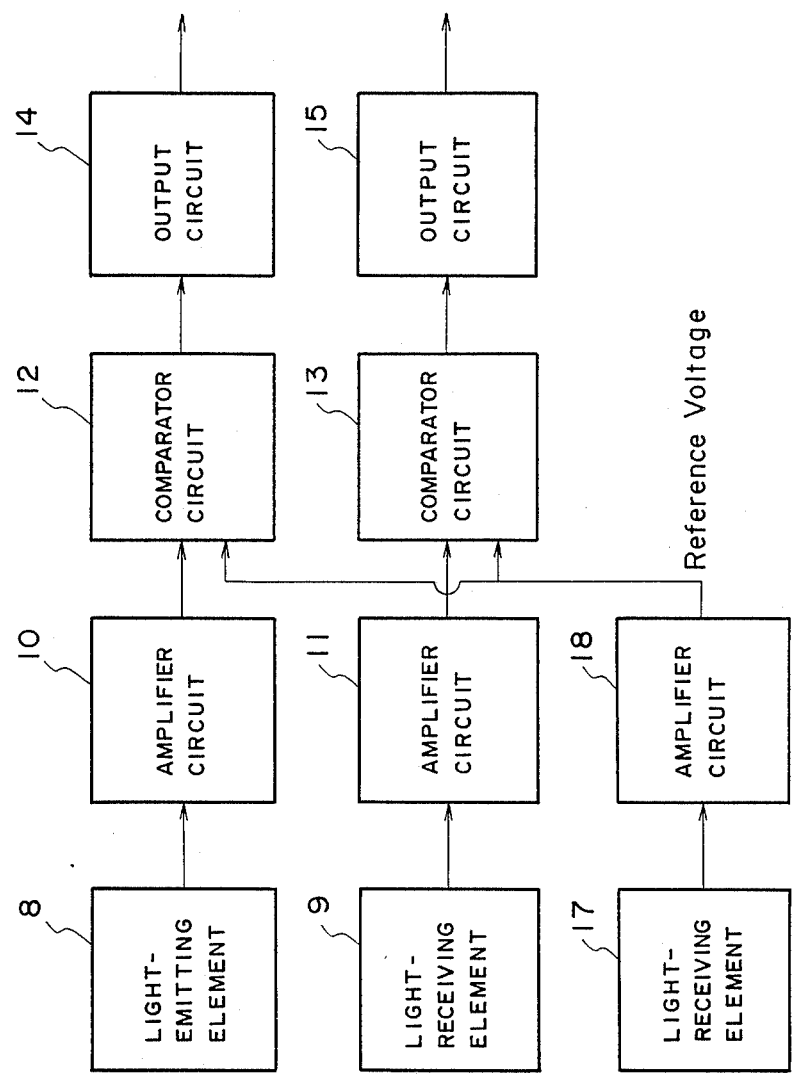
FIG. 2 is a block diagram of a turning angle measurement apparatus using the optical rotary encoder of the present invention.
Figure 3:
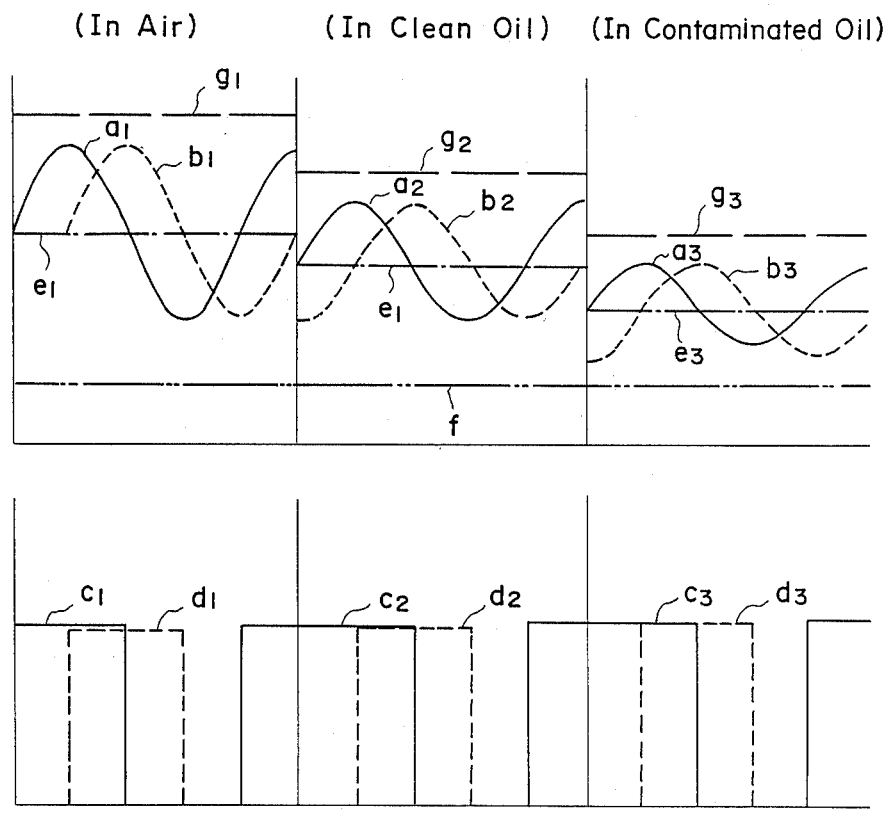
FIG. 3 is a waveform diagram of various waveforms associated with the turning angle measurement apparatus of FIG. 2.
Figure 10:
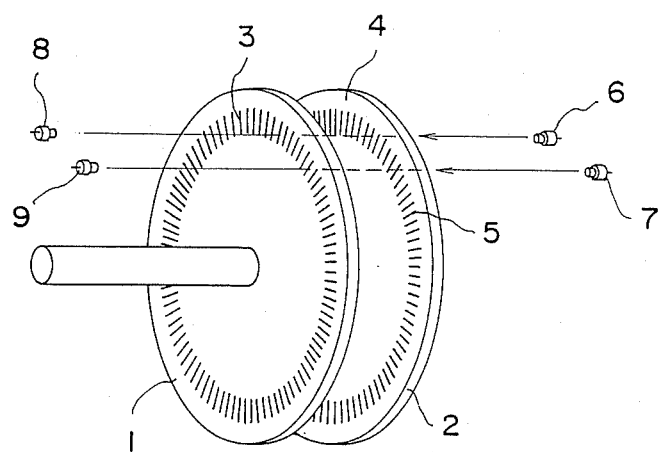
FIG. 10 is a perspective view illustrating an optical rotary encoder according to the prior art.
Figure 11:
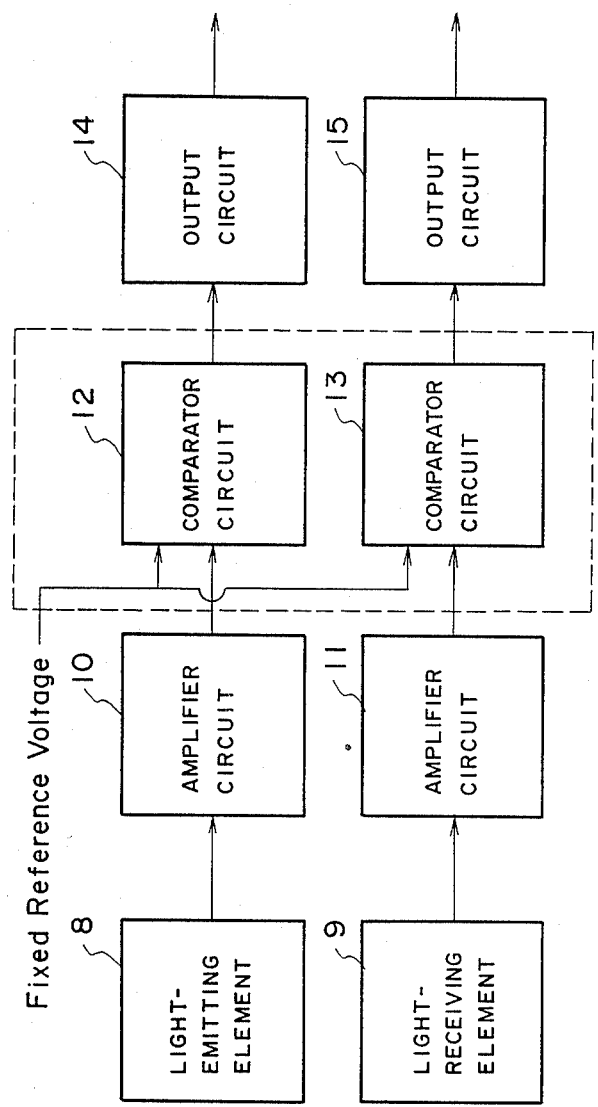
FIG. 11 is a block diagram of a conventional turning angle measurement apparatus using the optical rotary encoder of FIG. 10.
Figure 12:
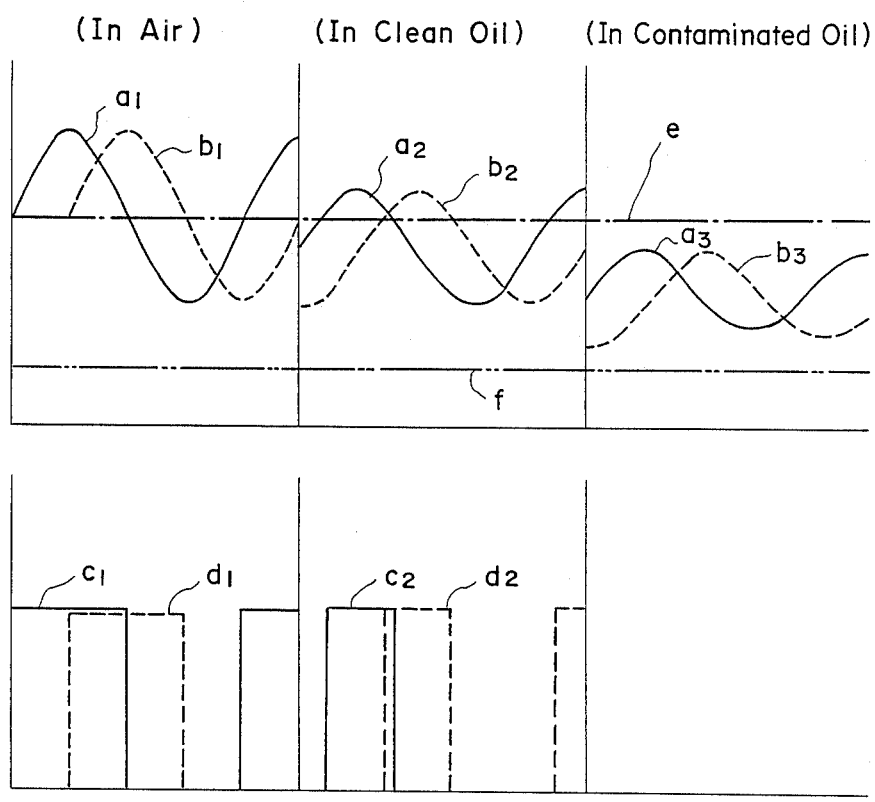
FIG. 12 is a waveform diagram of various waveforms associated with the turning angle measurement apparatus of FIG. 11.

FIG. 1 illustrates a rotary encoder used to compensate for light intensity in the optical rotary encoder according to the invention, FIG. 2 is a block diagram of a turning angle measurement apparatus using the optical rotary encoder of FIG. 1, and FIG. 3 is a waveform diagram of various waveforms associated with the turning angle measurement apparatus of FIG. 2. Portions similar or corresponding to those shown in FIGS. 10, 11 and 12 are designated by like reference numerals. As shown in FIG. 1, the optical rotary encoder includes two opposing slitted disks $1'$, $2'$. The disk $1'$ is provided along its circumference with two rows of identical slits $3_1$, $3_2$, the row of slits $3_2$ being closer to the center of the disk. The disk $2'$ is provided along its circumference with two rows of slits $4_1$, $4_2$. The slits $4_1$, $4_2$ are mutually staggered by one-quarter pitch, with the row of slits $4_2$ being closer to the center of the disk $2'$. The encoder further includes a pair of light-emitting and light-receiving elements 16, 17 for judging the environmental conditions. The light-emitting and light-receiving elements 6, 8 are arranged in line with the outer slits in the disks $1'$, $2'$, and the light-emitting and light-receiving elements 7, 9 are arranged in line with the inner slits of these disks. As shown in FIG. 2, the output of the light-receiving element 17 is amplified to a predetermined level by an amplifier circuit 18. In FIG. 3, levels $g_1$, $g_2$, $g_3$ represent the output of the light-receiving element 17 in air, clean oil and contaminated oil, respectively, the waveforms $c_3$, $d_3$ indicate the outputs of the comparator circuits 12, 13 when the encoder operates in contaminated oil, and the levels $e_1$, $e_2$, $e_3$ represent reference voltages applied as an input to one input terminal of the comparator circuits 12, 13 for operation in air, clean oil and contaminated oil, respectively.

Let us now describe the operation of the rotary encoder. When the encoder operates in air, the comparator circuit 18 produces the output $e_1$, which corresponds to a level obtained as a result of multiplying a voltage difference between the maximum output $g_1$ from light-receiving element 17 and the voltage $f$, which prevails when no light reaches the element 17, by a suitable coefficient. Note that the light reaching the light-receiving element 17 from the light-emitting element 16 does not pass through the slits. The output $e_1$ is applied to the comparator circuits 12, 13 as the reference voltage. As in the case of FIG. 11, the comparator circuits 12, 13 compare the level $e_1$ with the outputs $a_1$, $b_1$ having the 90° phase shift obtained from the light-receiving elements 8, 9 corresponding to the outer and inner slits, respectively. The comparator circuits 12, 13 respectively output the pulses $c_1$, $d_1$ when $a_1$, $b_1$ are greater than $e_1$. The turning angle is measured by integrating these pulses.

When the rotary encoder is used in clean oil, the outputs $a_2$, $b_2$ obtained from the respective light-receiving elements 8, 9 are smaller than $a_1$, $b_1$, and the maximum output voltage obtained from the light-receiving element 17 also decreases to $g_2$. This is accompanied by a decrease, to $e_2$, in the reference voltage obtained from the amplifier circuit 18. As a result, the comparator circuits 12, 13 produce output pulses $c_2$, $d_2$, which are identical to the output pulses $c_1$, $d_1$ obtained from these comparator circuits when the encoder is used in air.

Similarly, when the encoder is used in contaminated oil, the outputs from the respective light-receiving elements diminished to $a_3$, $b_3$, the maximum output voltage $g_3$ falls to $g_3$ and, hence, the reference voltage $e_3$ is reduced to $e_3$. Therefore, the output pulses $c_3$, $d_3$ are obtained from the comparator circuits 12, 13, respectively. Accordingly, even if there is a reduction in the transmitted light resulting in less light being received by the light-receiving elements 8, 9, correct output pulses are obtained based on the light which has passed through the slits. This makes it possible to measure the turning angle precisely.

Figure 4:
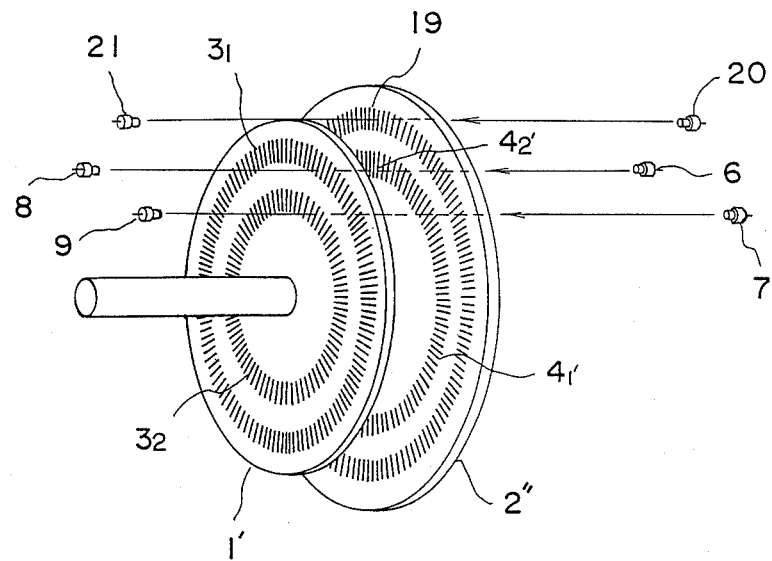
FIGS. 4 and 5 are a perspective views illustrating other embodiments of an optical rotary encoder according to the present invention.

FIG. 4 illustrates a second embodiment of an optical rotary encoder according to the present invention. The rotary encoder includes the disk $1'$ having the slits $3_1$, $3_2$ and a disk $2''$ larger than the disk 2 of FIG. 1. The disk $2''$ has rows of slits $4_1'$, $4_2'$ corresponding to the slits $4_1$, $4_2$ of FIG. 1, and an outermost row of circumferential slits 19 of small slit width and a small pitch. The rotary encoder further includes light-emitting and light-receiving elements 20, 21 opposing each other across the row of slits 19. The light-emitting and light-receiving elements 6, 8 are arranged in line with the slits $3_1$, $4_1'$, and the light-emitting and light-receiving elements 7, 9 are arranged in line with the slits $3_2$, $4_2'$.

By making the width and pitch of the slits 19 suitably small, the light-receiving element 21 will produce an output corresponding to the average of the outputs from the light-receiving elements 8, 9. If this is used as the reference levels $e_1-e_3$ as in the case of FIG. 3, an accurate measurement of turning angle can be performed even if there is a change in light transmission through the medium in which the encoder is used.

Figure 5:
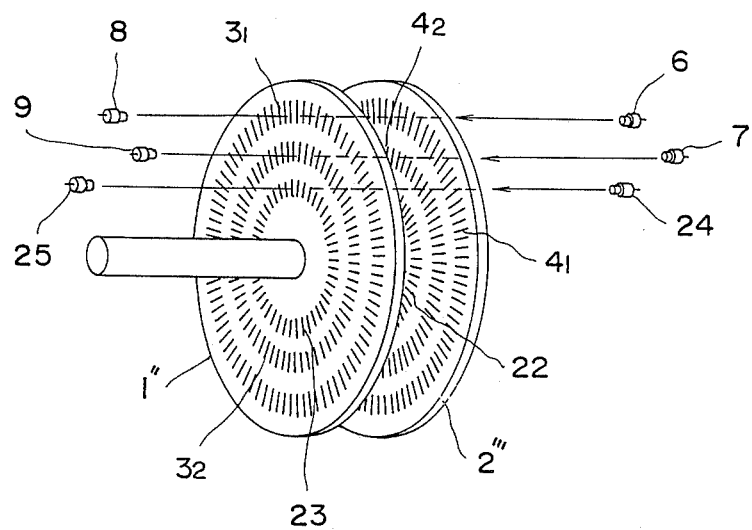
Figure 6:
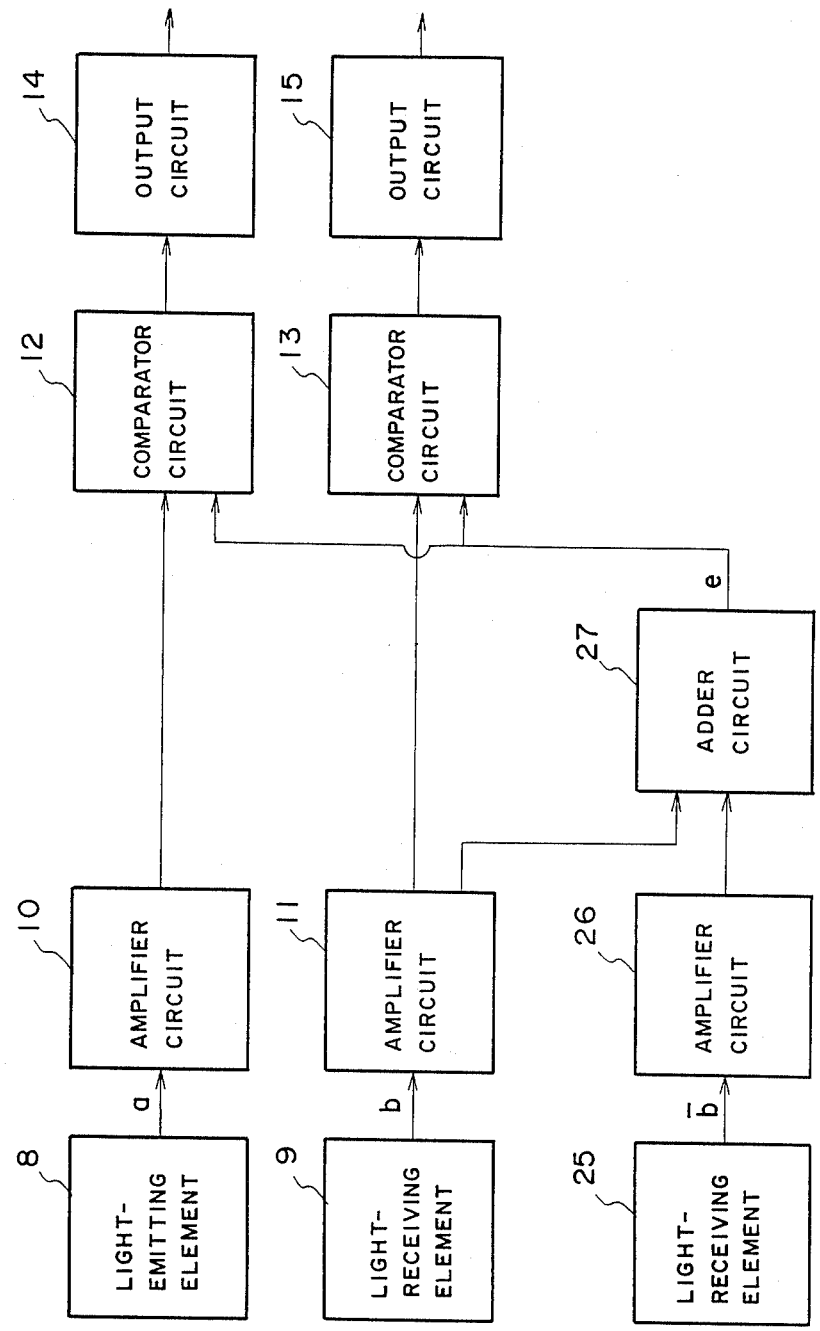
FIG. 6 is a block diagram of a turning angle measurement apparatus using the optical rotary encoder of FIG. 5.
Figure 7:
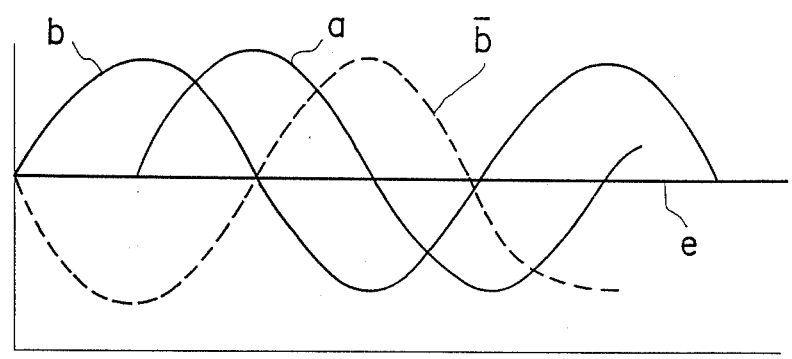
FIG. 7 is a waveform diagram of various waveforms associated with the turning angle measurement apparatus of FIG. 6.

FIG. 5 illustrates a third embodiment of an optical rotary encoder according to the present invention. The encoder includes two opposing slitted disks $1''$, $2'''$. In addition to the two rows of slits $4_1$, $4_2$ of FIG. 1, the disk $2'''$ is provided with an innermost row of circumferentially arrayed slits 22 for producing an output 180° out of phase with the slits $4_1$ or $4_2$. The slits 22 are staggered by one-half pitch with respect to the slits $4_1$, $4_2$. In addition to the two rows of slits $3_1$, $3_2$ of FIG. 1, the disk $1'$ is provided with an innermost row of circumferentially arrayed slits 23 identical with the slits $3_1$, $3_2$ and corresponding to the slits 22. The rotary encoder further includes light-emitting and light-receiving elements 24, 25 opposing each other across the rows of slits 22, 23. The light-emitting and light-receiving elements 6, 8 are arranged in line with the slits $3_1$, $4_1'$, and the light-emitting and light-receiving elements 7, 9 are arranged in line with the slits $3_2$, $4_2'$. FIG. 6 is a block diagram of a turning angle measurement apparatus using the encoder of FIG. 5, and FIG. 7 is a waveform diagram of waveforms associated with the apparatus of FIG. 6. In FIG. 6, numeral 26 denotes an amplifier circuit receiving the output of the light-receiving element 25, and numeral 27 denotes an adder circuit whose two inputs are the output of the amplifier circuit 11 and the output of the amplifier circuit 26. Other portions similar or corresponding to those of FIGS. 1 and 2 are indicated by like reference numerals.

In operation, the light-receiving elements 8, 9 for measuring the turning angle produce outputs having the waveforms a, b (FIG. 7), respectively, in dependence upon relative rotation of the disks 1″, 2‴, and the light-receiving element 25 produces an output $\bar{b}$ which is 180° out of phase with respect to the waveform b. By adding these outputs b, $\bar{b}$ that differ in phase by 180°, the adder circuit 27 produces the average value e of these two outputs. The value e will always indicate the zero level of the amount of fluctuation (AC component) of the waveforms a, b even if a, b change due to a variation in light transmission. Therefore, if the level e is applied to the comparator circuits 12, 13 as the reference voltage, output pulses of a fixed width will be obtained from the comparator circuits 12, 13 even if there is a change in the amount of received light due to use of the encoder in air, clean oil or contaminated oil, just as set forth above in connection with FIG. 3. It is thus possible to measure the turning angle accurately.

In the foregoing description, outputs displaced in phase by 90° are obtained by using slitted disks provided with inner and outer slits staggered by one-quarter pitch. However, outputs displaced in phase by 90° can also be obtained by using two identical opposing slitted disks having identically shaped inner and outer slits staggered by one-eighth pitch. This is advantageous since only one type of slitted disk need be fabricated.

Figure 8:
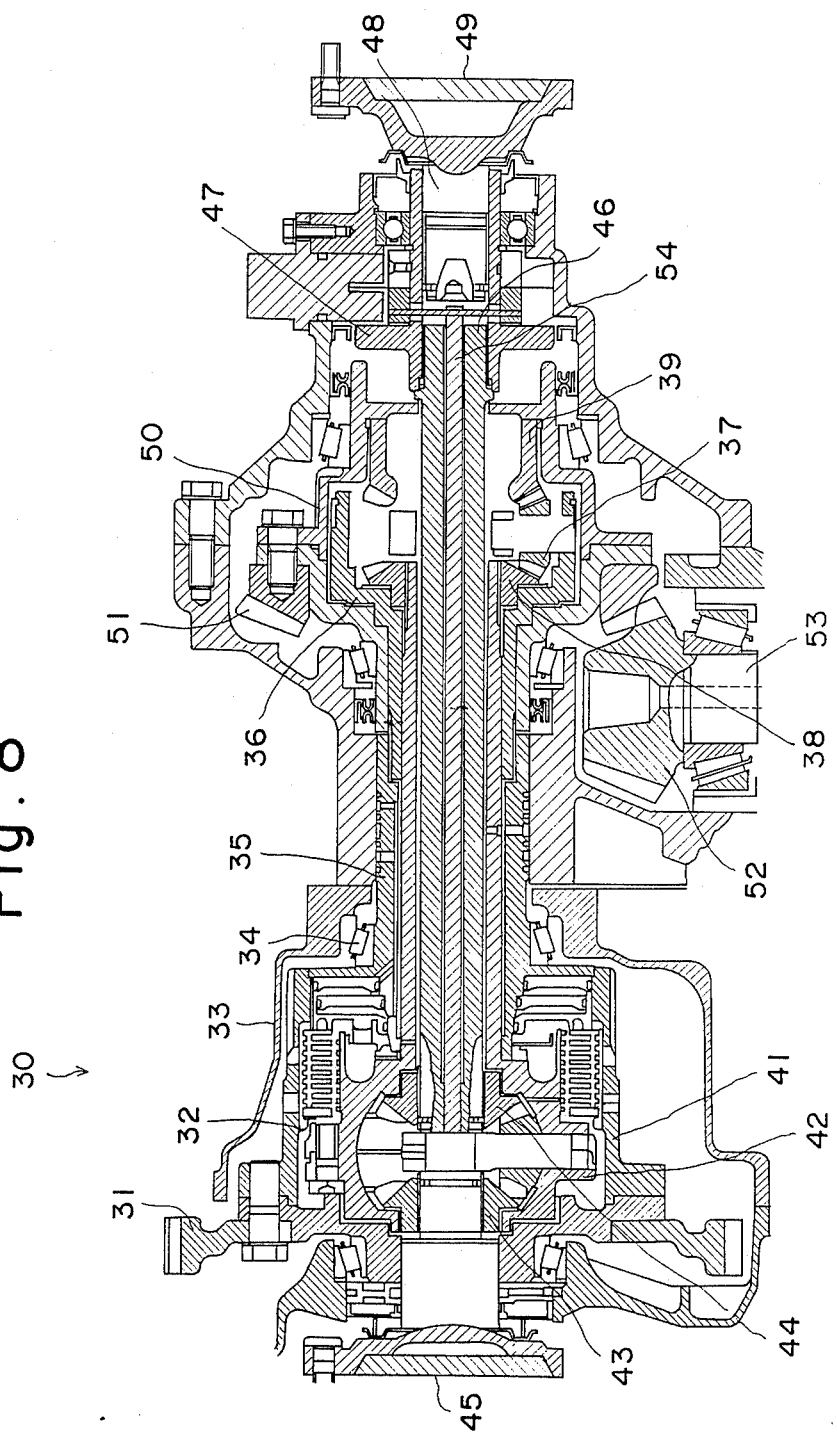
FIG. 8 is a sectional view showing an exemplary arrangement in which an optical rotary encoder according to the present invention is applied to a transfer system of a four-wheel drive vehicle with a center differential.
Figure 9:
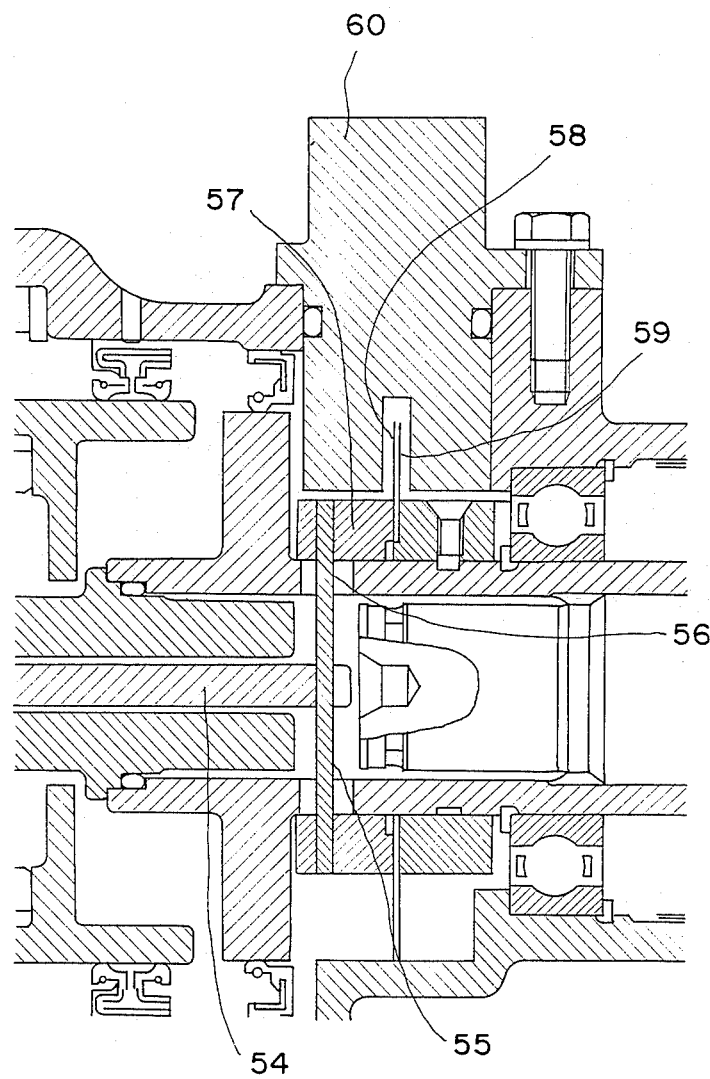
FIG. 9 is an enlarged view of a portion of FIG. 8.

FIG. 8 illustrates a transfer system of a four-wheel drive vehicle equipped with a center differential and employing a rotary encoder in accordance with the present invention. FIG. 9 is an enlarged view of the encoder portion. Numeral 30 denotes a transfer, A a center differential mechanism, B a front differential mechanism, 31 a ring gear, 32 a front differential case, 33 a clutch for the center differential, 34 a conical roller bearing, 35 a first hollow shaft, 36 a differential carrier, 37 a differential pinion, 38, 39 side gears, 40 a second hollow shaft, 41 a differential carrier, 43 a differential pinion, 43, 44 side gears, 45 a left front-wheel drive shaft, 46 a third hollow shaft, 47 a fourth hollow shaft, 48 a shaft, 49 a left front-wheel drive shaft, 50 a center differential case, 51 a ring gear for rear-wheel drive, 52 a gear, 53 a drive pinion shaft, 54 a slender rod, 55 a rod provided at the distal end of the rod, 56 a window provided in the fourth hollow shaft, 57 a cylinder body, 58 a slitted disk provided in the cylinder body, 59 a slitted disk fixedly secured to the fourth hollow shaft 47, and 60 a turning angle pick-up mechanism.

Generally speaking, when the engine is installed in the front of a four-wheel drive vehicle equipped with a center differential, the transfer mechanism is of the type shown in FIG. 8. Specifically, rotation of the engine is subjected to a suitable speed change via an automatic transmission mechanism (not shown) and is transmitted to the front differential case 32 through the ring gear 31 disposed in the transfer 30. When the vehicle is traveling in an ordinary manner, the clutch 33 for the center differential is in the disengaged state. Under these conditions, rotation of the front differential case 32 is transmitted to the differential carrier 36 of the center differential mechanism A through the first hollow shaft 35, and then is transmitted from the differential pinion 37 to the left and right side gears 38, 39. The rotation of the left side gear 38 is transmitted to the differential carrier 41 of the front differential mechanism B through the second hollow shaft 40, and then from the differential pinion 42 to the left and right side gears 43, 44.

Rotation of the left side gear 43 is transmitted to the left front-wheel drive shaft 45 from the left side gear 43, and rotation of the right side gear 44 is transmitted to the right front-wheel drive shaft 49 via the third hollow shaft 46, the fourth hollow shaft 47 splined to the shaft 46, and the shaft 48 splined to the fourth hollow shaft 47. Rotation of the right side gear 39 is transmitted to the center differential case 50 splined to the gear 39, and then to the drive pinion shaft 53 via the rear wheel-drive ring gear 51 and gear 52. The rotation is then transmitted to the left and right front-wheel drive shafts via a propeller shaft and rear differential unit, which are not shown.

If a large driving force is required as when traveling on a snow-covered or sandy road, or if it is feared that the wheels of the vehicle may slip, the clutch 33 for the center differential is engaged to lock the center differential mechanism A. When this is done, the rotation of the front differential case 32 is transmitted directly to the differential carrier 41 of the front differential mechanism B via the clutch 33 for the center differential. The rotation is then transmitted from the differential pinion 42 to the left and right side gears 43, 44 and thence to the left and right front-wheel drive shafts 45, 49, respectively. At the same time, the differential carrier 36 and left side gear 38 of the center differential unit A rotating in unison with the front differential case 32 and differential carrier 41 via the hollow shafts 35, 40, respectively, corotate without differential motion. This rotation is transmitted to the center differential case 50. As a result, rotation at a speed identical with that of the differential carrier 41 for front-wheel drive is transmitted to the ring gear 51 for rear-wheel drive, thereby driving the left and right rear-wheel drive shafts.

Let us now describe front-wheel drive shaft torque measurement, namely drive shaft torsion angle measurement. Rotation of the right side gear 44 is transmitted to the third hollow shaft 46 and, at the same time, to the rod 54 press-fitted into the third hollow shaft 46 at a base end portion. The third hollow shaft 46 drives the right front-wheel drive shaft 49 via the fourth hollow shaft 47, which has the slitted disk 59 affixed thereto, and the shaft 48. Meanwhile, the rod 54 drives solely the slitted disk 58 via the rod 55 and cylinder body 57 and rotates freely in an unloaded state.

Accordingly, in the unloaded state where the right front wheel is floating free, the slitted disks rotate in synchronism. When a load acts upon the right front wheel, however, the third hollow shaft 46 twists. As a result, the rotational phase of the slitted disk 59 lags behind that of the slitted disk 58 so that relative rotation develops between the two. This relative rotation is detected by light-emitting and light-receiving elements in the manner described above. In this case, the pick-up mechanism 60 is adapted to block out the ambient light completely so that it will not be detected by the light-receiving element. The output obtained from the light-receiving element is compared with a reference voltage as set forth above, thus enabling accurate measurement of the relative rotation and, hence, the load torque of the right front-wheel drive shaft.

In the above embodiment, the third hollow shaft 46 is for front-wheel drive. However, an opposite arrangement can be adopted in which the rod 54 is used for front-wheel drive and the slitted disk 58 is rotated by the third hollow shaft 46. Further, if it is so arranged that the light-receiving element receives light passing through a plurality of slits, solely the change in the amount of light passing through the slits due to relative rotation of the two disks can be detected without picking up intermissions in the light caused by rotation of the disks.

Thus, according to the present invention as set forth above, when measuring a turning angle such as an angle of torsion by using the optical rotary encoder, the state of the environment is determined by relying upon the compensatory light-emitting and light-receiving elements and correcting the reference voltage of the comparator circuits based on the results of the determination. Accordingly, the turning angle can be measured accurately by obtaining output pulses of a fixed width at all times even if there is a decrease in light generated by the light-emitting elements or a reduction in the amount of light received by the light-receiving elements due to a decline in optical transmission caused by a poor environment. This makes it possible to immerse the encoder in the oil filling the transfer of a four-wheel drive vehicle or the like to accurately measure drive shaft torque, namely an angle of torsion or the like.

As many apparently widely different embodiments of the present invention can be made without departing from the spirit and scope thereof, it is to be understood that the invention is not limited to the specific embodiments thereof except as defined in the appended claims.

What I claim is:

1. An optical rotary encoder, comprising:
   at least two opposing disks which rotate relative to each other, wherein each disk is provided with slits;
   a first set of light-emitting and light-receiving elements arranged with the disks interposed therebetween for generating an output relative to the rotation of said disks; and
   a second set of light-emitting and light-receiving elements for light intensity compensation,
   wherein a corrective reference voltage is obtained in response to an output from the second set of light-emitting and light-receiving elements and the output from the first set of light-emitting and light-receiving elements is compensated by the corrective reference voltage for determining the relative rotation of the disks.

2. The optical rotary encoder according to claim 1, wherein the first set of light-emitting and light-receiving elements comprises at least two sets of light-emitting and light-receiving elements arranged with the slits interposed therebetween, the slits being staggered by at least one-quarter pitch.

3. The optical rotary encoder according to claim 1, wherein the disk are each provided with inner and outer circumferentially extending rows of slits staggered by at least one-eighth pitch, said disks being arranged to face each other.

4. The optical rotary encoder according to claims 1, 2 or 3, wherein the second pair of light-emitting and light-receiving elements are provided to oppose each other at positions where the two disks are not interposed therebetween.

5. The optical rotary encoder according to claim 1, 2 or 3, wherein the second set of light-emitting and light-receiving elements are arranged to oppose each other with slits interposed therebetween, said slits being staggered by one-half pitch with respect to slits corresponding to the first set of light-emitting and light-receiving elements, an average value of outputs from the first set of light-emitting and light-receiving elements serving as the corrective reference voltage.

6. The optical rotary encoder according to claim 1, 2 or 3, wherein the second set of light-emitting and light-receiving elements are provided for one of the disks with slits of said one disk interposed therebetween, said slits being provided for obtaining an average output from the first set of light-emitting and light-receiving elements.

7. The optical rotary encoder according to claim 6, wherein said slits for obtaining the average output are small in width and small in pitch.

8. The optical rotary encoder according to claim 6, wherein said slits for obtaining the average output are provided in an outer circumferential portion of one of said disks, which is larger in diameter than the other of said disks.

9. An optical rotary encoder, comprising:
   at least two opposing disks which rotate relative to each other, wherein each disk is provided with slits;
   a first pair of light-emitting and light-receiving elements arranged with said two disks interposed therebetween for generating an output relative to the rotation of said disks;
   a second pair of light-emitting and light-receiving elements for light intensity compensation; and
   means for compensating for the output from said first pair of light-emitting and light-receiving elements by a corrective reference voltage obtained from an output produced by said second pair of light-emitting and light-receiving elements, wherein
   one of said two disks being driven by a first shaft for wheel drive driven by a side gear of a differential mechanism, the other of said two disks being driven by a second shaft driven by said side gear.

10. The optical rotary encoder according to claim 9, wherein said first pair of light-emitting and light-receiving elements comprises two sets of light-emitting and light-receiving elements arranged with the slits interposed therebetween, the slits being staggered by one-quarter pitch.

11. The optical rotary encoder according to claim 9, wherein said two disks are each provided with inner and outer circumferentially extending rows of slits staggered by one-eighth pitch, said disks being arranged to face each other.

12. The optical rotary encoder according to claims 9, 10 or 11, wherein said second shaft is a hollow cylindrical body and said first shaft extends through the interior of said second shaft.

13. The optical rotary encoder according to claims 9, 10 or 11, wherein said second pair of light-emitting and light-receiving elements are provided to oppose each other at positions where said two disks are not interposed therebetween.

14. The optical rotary encoder according to claims 9, 10 or 11, wherein said second pair of light-emitting and light-receiving elements are arranged to oppose each other with slits interposed therebetween, said slits being staggered by one-half pitch with respect to slits corresponding to said first pair of light-emitting and light-receiving elements, an average value of outputs from said first pair of light-emitting and light-receiving elements serving as the corrective reference voltage.

15. The optical rotary encoder according to claims 9, 10 or 11, wherein said first shaft is a hollow cylindrical body and said second shaft is a rod extending through the interior of said first shaft.

16. The optical rotary encoder according to any of claims 9, 10 or 11, wherein said second pair of light-emitting and light-receiving elements are provided for one of said two disks with slits of said one disk interposed therebetween, said slits being provided for obtaining an average output from said first pair of light-emitting and light-receiving elements.

17. The optical rotary encoder according to claim 15, wherein said rod is press-fitted into a part of the hollow portion of said first shaft.

18. The optical rotary encoder according to claim 15, wherein the disk driven by said second shaft is driven via a rod fitted on said shaft and extending through a window provided in a side wall portion of a hollow shaft coupled to said first shaft.

19. The optical rotary encoder according to claim 16, wherein said slits for obtaining the average output are small in width and small in pitch.

20. The optical rotary encoder according to claim 16, wherein said slits for obtaining the average output are provided in an outer circumferential portion of the one of said two disks, which is larger in diameter than the other of said two disks.

* * * * *